April 22, 1941. L. F. NENNINGER 2,239,567
MILLING MACHINE SPINDLE CONSTRUCTION
Filed June 14, 1939
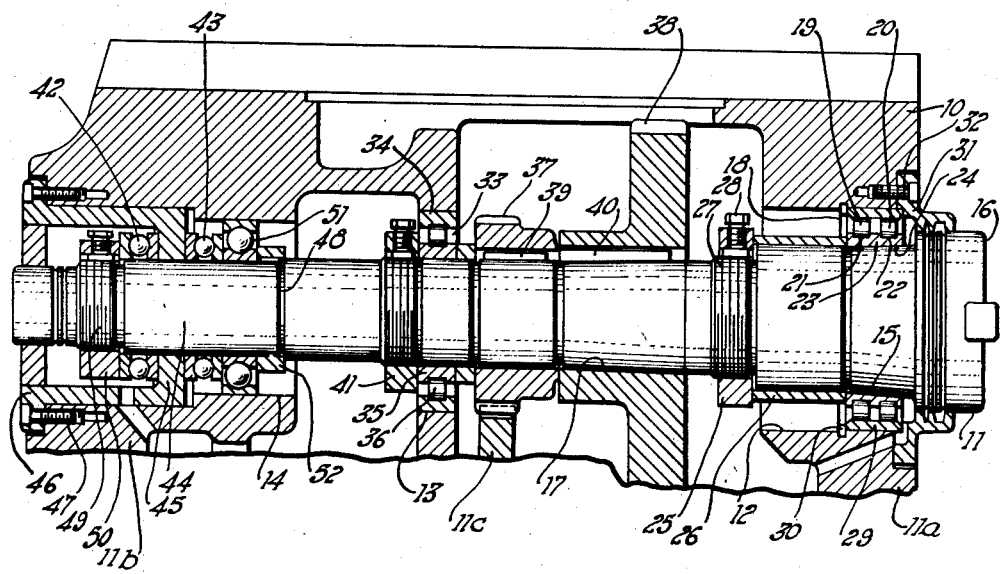
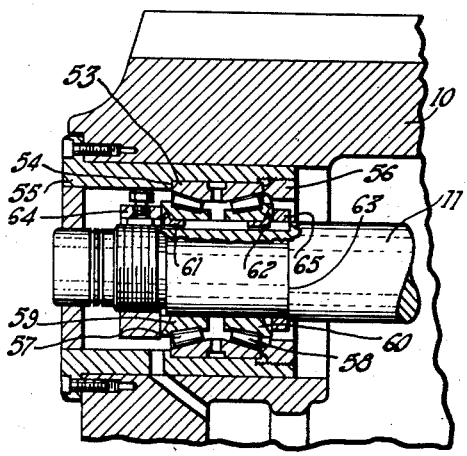
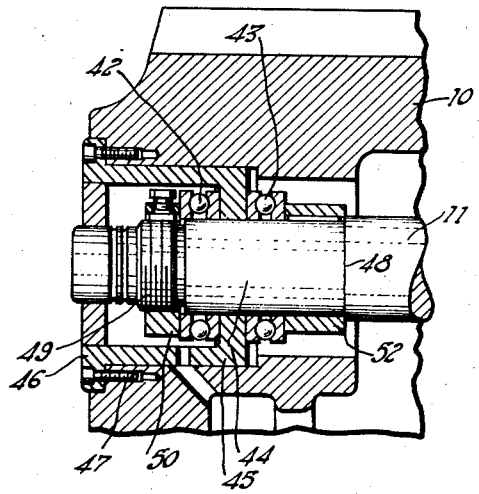
INVENTOR.
LESTER F. NENNINGER
BY
*A. K. Parsons*
ATTORNEY.

Patented Apr. 22, 1941

2,239,567

UNITED STATES PATENT OFFICE 2,239,567

MILLING MACHINE SPINDLE CONSTRUCTION

Lester F. Nenninger, Cincinnati, Ohio, assignor to The Cincinnati Milling Machine Co., Cincinnati, Ohio, a corporation of Ohio Application June 14, 1939, Serial No. 279,149

8 Claims. (Cl. 90—11)

This invention relates to machine tools and more particularly to improvements in the spindle construction of milling machines.

One of the objects of this invention is to improve the spindle construction of milling machines whereby high speeds may be obtained without excessive heat generation.

Another object of this invention is to provide an improved spindle construction for milling machines which is economical in cost and simple in construction.

Other objects and advantages of the present invention should be readily apparent by reference to the following specification, considered in conjunction with the accompanying drawing forming a part thereof and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is a sectional view illustrating the improved construction of this invention.

Figure 2 is a modified form of rear bearing shown in Figure 1.

Figure 3 is a view of another modified form of rear bearing shown in Figure 1.

In the operation of precision machine tools one of the chief factors effecting the precision thereof is the heat generated by friction during rotation of the parts. It is obvious that the greater the speed of rotation, the greater will be the amount of heat generated. The present tendency in milling machine design has been toward greater maximum spindle speeds, and this has rendered present designs unsatisfactory from a thermal point of view on account of the excessive amount of heat which is generated at the maximum speeds. This invention aims to improve the spindle construction of such machines whereby maximum speeds may be obtained without excessive heat generation.

Referring to Figure 1 of the drawing, the reference numeral 10 indicates generally the casing or housing for a milling machine spindle 11, the casing or housing taking the form of the upper portion of a column of a milling machine having a front wall 11a, a rear wall 11b and an intermediate wall 11c. The walls are provided with three aligned apertures indicated generally by the reference numerals 12, 13 and 14. The spindle is provided with a tapered or conical surface 15 which is closely adjacent to the nose or driving end 16 of the spindle; and a second tapered surface 17 located intermediate the ends of the spindle. Attention is invited to the fact that the tapered surface 17 is smaller in diameter than the tapered surface 15 whereby annular parts to be assembled on the front end of the spindle may easily be passed over the intermediate tapered surface.

In order to reduce the number of co-acting running parts and thereby reduce the possible sources of heat generation, a very simple construction has been evolved for journaling the spindle in the front wall aperture 12. An antifriction radial bearing, indicated generally by the reference numeral 18, has been provided and the function of this bearing is limited to preventing radial movement of the spindle during rotation thereof thus limiting the number of parts which must run at the higher peripheral speed, as compared to other bearings on the spindle, due to the larger diameter of the spindle at its forward end.

The bearing 18 is a cylindrical roller bearing having two circumferential rows 19 and 20 of cylindrical rollers which are guided against lateral movement in grooves 21 and 22 formed in the inner race member 23. The inner race has a tapered bore 24 by which it is fitted to the tapered surface 15 of the spindle.

By rotating the nut 25 relative to the threads 27 on the spindle the inner race may be forced by means of the intervening sleeve 26 upon taper 15 to hold the same against relative movement with respect to the spindle. A locking screw 28 is threaded in the nut 25 for locking it to the spindle.

The outer race 29 of the bearing 18 is held against axial movement in the aperture 12 between shoulder 30 and clamping ring 31. The ring 31 is secured to the column 10 by suitable means such as the bolts 32. Attention is invited to the fact that the inner bore of the outer race 29 is a plain cylindrical bore which permits axial movement of the spindle but prevents radial movement thereof.

A second cylindrical roller bearing 33 is mounted in the aperture 13 and this bearing consists of an outer race 34, an inner race 35 and a single row of cylindrical rollers 36 interposed between the two.

The means for driving the spindle comprising the pinion 37 and the large gear 38 are mounted on the spindle between the bearings 18 and 33, the large gear 38 having a tapered bore for mounting on the taper 17 of the spindle. The gears 37 and 38 are keyed to the spindle by the keys 39 and 40 respectively. The small gear 37 and the inner race 35 are clamped between the hub of the large gear 38 and a nut 41 which is threaded on the spindle. Since the cylindrical rollers 36 ride in grooves formed in both the inner and outer race members, the lateral position of the outer race 34 is determined by the position of the inner race and since the outer periphery of the race 34 is a plain cylinder it will be apparent that the bearing 33 only serves to prevent lateral movement of the spindle and does not serve to determine the axial position thereof.

Thus, the two bearings 18 and 33 have been made as simple as possible and their function limited to preventing lateral movement or deflection of the spindle.

The sole means for preventing axial movement of the spindle is mounted in the rear wall aperture 14 and consists of two thrust bearings indicated generally by the reference numerals 42 and 43.

The advantage of locating the thrust bearings in this position is that the rear portion 44 of the spindle is smaller in diameter than the other portions, which means that the thrust bearings may be smaller in diameter and therefore have less peripheral speed which means less heat generation.

The thrust bearings are located on opposite sides of a flange 45 formed internally on the cap member 46 which is fastened to the rear wall by bolts 47. The spindle is provided with a shoulder 48 at one end of the portion 44 and a thread 49 at the other end upon which is threaded a clamping nut 50. In the form shown in Figure 1 an additional radial, anti-friction bearing 51 is interposed between the thrust bearing 43 and the shoulder 48. By tightening the nut 50 a preloading pressure is exerted on the thrust bearings which compress on the flange 45 whereby the latter determines the axial position of the spindle and resists any axial thrust on the spindle during working. The predetermined axial position of the spindle may be varied by varying the width of the spacer ring 52 which is interposed between the bearing 51 and the shoulder 48.

In Figure 2 there is shown a modified form of rear bearing in which the radial bearing 51 has been eliminated, thereby providing a spindle construction in which the front and intermediate bearings are purely radial bearings to prevent any lateral movement or deflection of the spindle and the rear bearing serves to axially position the spindle and absorb any axial thrust thereon without functioning as a radial bearing. The advantage of this construction is that it is easier to align the spindle when only the front and intermediate apertures have to be accurately bored in alignment.

There is shown in Figure 3 a modified form of rear bearing combining the functions of a radial bearing and a thrust bearing and consisting of an outer race 53 which is fixed between a shoulder 54 on the cap member 55 and the face of an annular ring 56 threaded in the end of the cap member. Two rows of tapered roller bearings 57 and 58 are interposed between the outer race member and separate inner race members 59 and 60. The inner race members are keyed to the spindle by key members 61 and 62. The tapered rollers are oppositely positioned so that they may be preloaded or compressed between a shoulder 63 on the spindle and a clamping nut 64 threaded on the spindle on the opposite side of the race members from the shoulder. As in the other construction, a spacer 65 may be interposed between the race member 60 and the shoulder 63 for predetermining the axial positioning of the spindle.

There has thus been provided an improved spindle construction for milling machines comprising front and intermediate bearings which function to prevent radial movement of the spindle, and a third bearing which functions to axially position the spindle and take up all axial thrust thereon, the latter bearing being alternatively constructible to assume the function of a radial bearing if so desired. It will be noted that this construction is so designed that a minimum of heat will be generated whereby relatively high maximum speeds of spindle rotation may be obtained without deleterious overheating.

I claim:

1. In a milling machine having a column and a cutter spindle, the combination of means for supporting the spindle for rotation in the column, said column having a number of aligned apertures formed therein, comprising radial bearings mounted in a plurality of said apertures for supporting the spindle against lateral movement at a plurality of spaced axial points thereof, and means mounted in another of said apertures for determining the axial position of the spindle relative to said column and for absorbing axial thrust on the spindle during actuation thereof.

2. In a milling machine having a column and a cutter spindle, the combination of means for supporting the spindle in the column for rotation including a front cylindrical roller bearing having an outer race fixed with the column and an inner race fixed with the spindle, said inner race and rollers being axially movable relative to said outer race whereby the bearing only serves to prevent radial movement of the spindle; a second cylindrical roller bearing having an inner race fixed with the spindle, and an outer race subject to axial movement relative to the column whereby the bearing serves to prevent radial movement of the spindle; and a third bearing of the thrust type mounted on the spindle and having a portion fixed against axial movement in either direction relative to the column to determine the final axial position of the spindle.

3. In a milling machine having a column and a cutter spindle having spaced tapered surfaces thereon, the combination of a pair of radial bearings for supporting the spindle in the column against lateral movement, means to utilize said tapered surfaces for clamping parts of the respective bearings for rotation with the spindle, a thrust bearing mounted on the spindle having portions engaging a fixed part of the column and means carried by the spindle for preloading said thrust bearing and thus determining the axial position of the spindle with respect to the column.

4. In a milling machine, the combination of a column, a cutter spindle, said spindle having spaced tapered surfaces thereon, one of which is adjacent the nose of said spindle, a radial anti-friction bearing secured to the last-named tapered surface and having its outer race secured to the column, driving means mounted on the spindle in engagement with the other tapered surface, a second radial anti-friction bearing, means to clamp the inner race of said second bearing to the spindle and in frictional engagement with said driving means, said spindle having a portion projecting beyond said last-named bearing, and additional bearing means for supporting the projecting end of said spindle in said column.

5. In a milling machine, the combination of a column, a cutter spindle having spaced tapered surfaces thereon, one of which is adjacent the nose and the other intermediate the length of said spindle, a first radial anti-friction bearing having its inner race clamped on one of said tapered surfaces and its outer race fixed with the column, said outer race being formed to permit relative axial movement of the spindle but restraining radial movement of the spindle, driving gears mounted on the spindle and engaging the other of said tapered surfaces, a threaded clamping member, a radial anti-friction bearing having its inner race interposed between said clamping member and said gears whereby it may be frictionally secured for rotation with the spindle, and its outer race engaging the column for preventing radial movement of the spindle; and additional bearing means attached to another portion of said spindle and engaging the column for determining the axial position of the spindle relative to the column.

6. In a milling machine having a column and a cutter spindle, said column having a series of spaced aligned apertures therein, the combination of means for rotatably supporting the spindle within said apertures, one of said apertures being formed in the front wall and another in the rear wall of the column, a radial anti-friction bearing having its inner race attached to the spindle and its outer race attached to the front wall of the column for preventing radial movement of the spindle, a second anti-friction bearing having its inner race attached to an intermediate portion of said spindle and its outer race engaging the wall of one of said apertures, and additional anti-friction bearing means mounted in the aperture of the rear wall of said column, said last-named aperture having an internal flange, anti-friction thrust ball bearings mounted on the spindle on opposite sides of said flange, and means attached to the spindle for preloading said bearings against opposite sides of said flange for determining the axial position of said spindle.

7. In a milling machine, the combination of a column, a cutter spindle, said spindle having spaced tapered surfaces thereon, one of which is adjacent the nose of said spindle, a radial anti-friction bearing secured to the last-named tapered surface and having its outer race secured to the column, driving means mounted on the spindle in engagement with the other tapered surface, a second radial anti-friction bearing, means to clamp the inner race of said second bearing to the spindle and in directional engagement with said driving means, said spindle having a portion projecting beyond said last-named bearing, and thrust bearing means mounted on the projecting end of said spindle for transmitting axial thrust on the spindle to the column.

8. In a milling machine, the combination of a column, a cutter spindle and means to support the spindle for rotation in the column including a first radial anti-friction bearing secured to the spindle adjacent the driving end thereof, driving means secured to the spindle intermediate the ends thereof, a second radial anti-friction bearing mounted on the spindle adjacent to said driving means and frictionally clamped thereto and a thrust bearing mounted adjacent the end of the spindle opposite to the driving end, and means for transmitting the thrust therefrom to the column.

LESTER F. NENNINGER.